(12) United States Patent
Breivik

(10) Patent No.: US 6,652,285 B1
(45) Date of Patent: Nov. 25, 2003

(54) SYSTEM WHICH CAN REVERSIBLY REPRODUCE ITSELF

(76) Inventor: Jarle Breivik, Åsensvingen 5C, N-0488 Oslo (NO)

( * ) Notice: Subject to any disclaimer, the term of this patent is extended or adjusted under 35 U.S.C. 154(b) by 0 days.

(21) Appl. No.: 09/831,537

(22) PCT Filed: Nov. 5, 1999

(86) PCT No.: PCT/NO99/00334

§ 371 (c)(1),
(2), (4) Date: Jul. 5, 2001

(87) PCT Pub. No.: WO00/28507

PCT Pub. Date: May 18, 2000

(30) Foreign Application Priority Data

Nov. 11, 1998 (NO) .......................... 19985263

(51) Int. Cl.⁷ ............................................. G09B 23/26
(52) U.S. Cl. ..................................... 434/279; 434/278
(58) Field of Search ............................... 434/277, 278, 434/279; 446/85, 92, 129, 131, 132, 137

(56) References Cited

U.S. PATENT DOCUMENTS

| 3,594,924 A | | 7/1971 | Baker | |
|---|---|---|---|---|
| 3,854,233 A | * | 12/1974 | Dingman | .................... 434/278 |
| 3,941,402 A | * | 3/1976 | Yankowski | ............. 280/124 R |
| 3,998,004 A | * | 12/1976 | Erlich | .......................... 446/92 |
| 4,030,209 A | * | 6/1977 | Dreiding | .................... 434/278 |
| 4,238,905 A | * | 12/1980 | MacGraw | .................... 446/92 |
| 4,846,988 A | | 7/1989 | Skjeltorp | |
| 5,196,816 A | * | 3/1993 | Harting | ........................ 335/78 |
| 5,275,514 A | * | 1/1994 | Johnson | ........................ 408/76 |
| 6,017,220 A | * | 1/2000 | Snelson | ...................... 434/301 |
| 6,023,951 A | * | 2/2000 | Maurer | ........................ 70/57.1 |
| 6,104,270 A | * | 8/2000 | Elias | ............................ 335/289 |

FOREIGN PATENT DOCUMENTS

| DE | 23 41 320 | 3/1975 |
|---|---|---|
| DE | 35 02 968 | 7/1986 |
| SE | 155 807 | 8/1956 |

OTHER PUBLICATIONS

Harold J. Morowitz; "A Model of Reproduction"; *Amerikan Scientist*; 1959; vol. 47, pp. 261–263.
Derwent's abstract, No P8316 E/45, week 8245, Abstract of SU 896675, Jan. 7, 1982.
Copy of International Search Report for PCT/NO99/00334.

* cited by examiner

*Primary Examiner*—Derris H. Banks
*Assistant Examiner*—Kurt Fernstrom
(74) *Attorney, Agent, or Firm*—Merchant & Gould, P.C.

(57) ABSTRACT

It is described a system of independently moving elements with characteristics making them bind reversibly to each other according to certain rules such that they form self-replicating and mutating polymers subject to the general principles of natural selection, and use of the system to simulate the origin of life, for entertainment, decoration, scientific and educational purposes.

32 Claims, 13 Drawing Sheets

SYSTEM WHICH CAN REVERSIBLY REPRODUCE ITSELF

FIELD OF THE INVENTION

The present invention relates to a system of independently moving elements with characteristics which make them bind reversibly to each other according to certain rules such that they form self-replicating and mutating polymers subject to the general principles of natural selection, and use of the system to simulate the origin of life and molecular evolution.

BACKGROUND OF THE INVENTION

Self-replication and adaptability are the hallmarks of what is recognize as living systems, and in all biological systems both these properties are directly related to the structure and function of nucleic acids, i.e. DNA and RNA.

DNA is a linear polymer of deoxyribonucleotides. Each deoxyribonucleotide consists of three main groups, 1) a deoxyribose-a pentose sugar, 2) a phosphate group and 3) one of the heterocyclic nitrogenous bases, adenine (A), thymine (T), guanine (G) or cytosine (C)

A double helical DNA molecule consists of two complimentary, antiparallel strands of DNA. The phosphodiester bonds linking the 5' and 3' carbons of the adjacent sugar residues results in directionality of the polynucleotide chain. In the double stranded DNA molecule, the phosphodiester bonds of each polynucleotide chain run in opposite directions (i.e., 5'–3' and 3'–5') and are thus said to be antiparallel. Base pairing between strands is the result of hydrogen bonding between adjacent base pairs. Normally, A residues form 2 hydrogen bonds with T, and G residues form 3 hydrogen bonds with C resulting in complementary base pairing between the DNA strands. Therefore the sequence of bases in one strand determines the sequence of the complementary strand and is the basis of DNA replication. The two strands of DNA coil around a central axis in a right handed manner with the sugar-phosphate backbone on the exterior and the bases on the interior. The aromatic rings of the bases are stacked in the middle, perpendicular to the axis of the DNA double helix. A full rotation in the helical structure comprises ten nucleotides.

The nucleotides in a DNA strand are held together by strong covalent bonds between the phosphate and the sugar residues. The creation and breaking of these bonds requires supply of energy and in present organisms these reactions are catalyzed by energy consuming enzymatic reactions. The bonds between the complementary bases are weak hydrogen bonds and the attractive forces between two single nucleotides are weak. When the nucleotides are organized in DNA strands, large numbers of hydrogen bonds are coordinated, so that the attractive forces between two complementary strands become relatively strong. They are however responsive to heat (below 100° C.) and alkali, and are considerably weaker than the covalent bonds composing in the individual DNA strands.

All biological systems are based on the ability of the DNA molecule to store and reproduce information. The genetic information is stored in the structure of the DNA molecule as different sequences of nucleotides. Reproducing this information is achieved in that an existing nucleotide chain, via an intricate network of biochemical reactions, catalyzes the creation of a complementary chain.

It is today widely accepted that life on earth evolved from simple molecular structures by means of natural selection. This evolution process, which was first recognized by Charles R. Darwin, explains biological evolution in terms of a simple mechanism directly related to self-replication of biological information.

Human civilization is at present experiencing the early signs of a fast approaching revolution driven by incredible advances in biotechnology. Cloning of mammals is today a reality and genetic manipulation is performed as routine assays in laboratories all over the world. These advances constitute complex challenges to different parts of society, including political as well as private decision making. Consequently, there is a growing need for easily accessible information related to the fundamental aspects of biology. This need can be meet by a system, which in a simple manner simulates the biochemical and evolutionary mechanisms underlying the phenomenon commonly recognized as life.

Different systems have been proposed to simulate self-replication. In American Scientist, Vol. 47; 261–263, 1959 (H. J. Morowitz) it is suggested a system for simulating replication based on two types of element A and B, floating in water. A and B can bind to each other, but only if the binding is initiated by an existing complex of A and B. Thus an AB unit can catalyze creation of a new AB unit. Each element carries a battery and an electromagnet, but are also suggested to be powered by <<solar batteries>>. The described elements can, however, only combine to form AB units, and the system cannot proceed further to form more complex structures like polymers. Consequently this system can neither generate mutations, nor simulate evolution by means of natural selection. Furthermore, the binding between A and B elements is not reversible so there is no possibility of re-circulation (death) of the elements such that the process is open-ended. This system does not involve the use of natural magnets and ferromagnetism, nor is it any obvious manner by which such material could be used.

There are a number of known systems for demonstrating molecule structures such as proteins, DNA, or RNA wherein the elements are held together by magnetic forces, glue etc. (DE 23 41 320 A1, SE 15 58 07, U.S. Pat. No. 3,594,924). These systems are, however, all static models, which in no way simulate reversible chemical interactions, self-replication or evolutionary processes.

In SU 89 66 75 B it is described magnetic elements simulating items for demonstration of physico-mechanical properties of solids. The magnet elements are enclosed in an elastic shell and floating in a tank filled with a liquid. The repulsion forces between items can now be simulated in addition to elastic properties of solids. This system does not simulate self-replication or evolutionary processes, nor is it suggested to do so.

Thus there is an object to provide a system for demonstration/simulation of open-ended self-replication of polymers and the principle of evolution by means of natural selection.

These objects are obtained by the present invention characterized by the enclosed claims.

SUMMARY OF THE INVENTION

The present invention provides a system of independently moving elements with characteristics which make them bind to each other according to certain rules such that they form self-replicating and mutating polymers subject to the general principles of natural selection, and use of the system to simulate the origin of life and molecular evolution. The invention further comprises use of the system to simulate self-replication and natural selection of nucleic acids, wherein the evolution process is promoted and manipulated by controllable changes in the environment of the elements, e.g. temperature, light and turbulence, and by introducing modifying elements, and use of the system as an educational tool, an interactive game, a decoration and a tool for scientific purposes and computational purposes.

BRIEF DESCRIPTION OF THE DRAWINGS

In the following the invention will be described in greater detail by referring to the figures, wherein.

DETAILED DESCRIPTION

Figure 1:
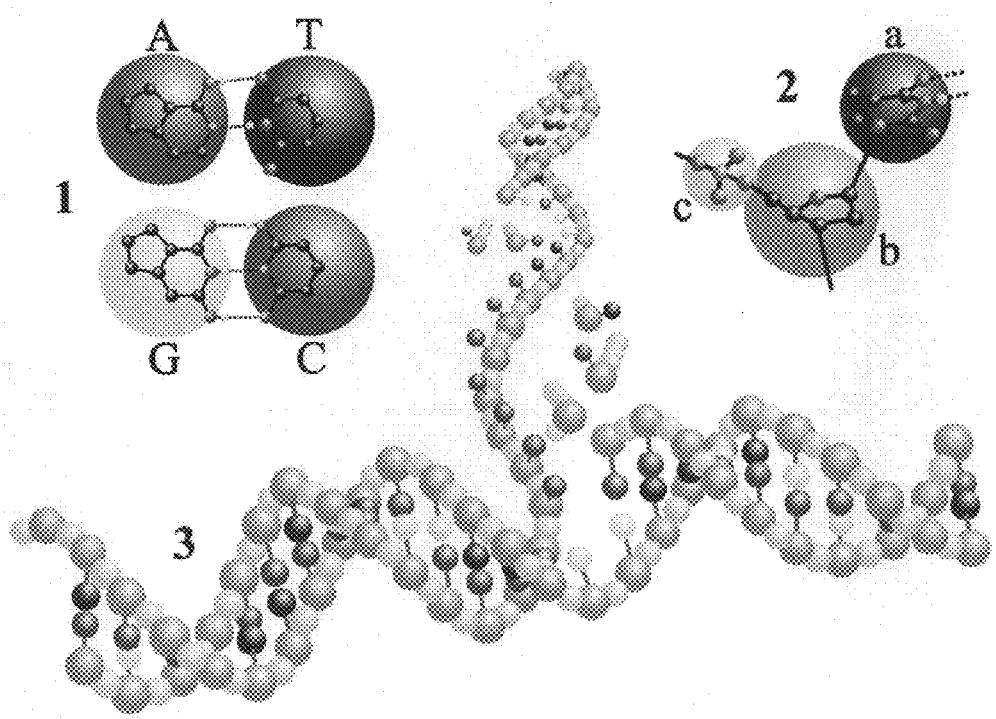
FIG. 1 illustrates the architecture of the DNA molecule. Panel 1, describes the four nitrogenous bases, adenine (A), thymine (T), guanine (G) or cytosine (C), and their respective paring A-T and G-C; panel 2, describes a nucleotide comprising a base (a), a phosphate group (c) and a ribose (b); while panel 3 demonstrates how the DNA helix is composed of complementary and antiparallel chains of nucleotides, and also illustrates how the two strands split apart and give rise to two new copies of the double-stranded DNA molecule.

As previously described self-replication is one of the hallmarks of living systems and a number of self-replicating systems or self-reproducing machines have been proposed as simulations of such systems, including the already described system by Morowitz. It is however surprising that no existing man-made system has succeeded in combining self-replication with the other essential element of living systems, i.e. adaptability.

Life on earth has evolved by means of natural selection and it is this fundamental mechanism which underlies the adaptability of biological systems. This adaptability as well as the process of self-replication can be directly traced to the structure and function of the DNA molecule. In present organisms an intricate network of interrelated biochemical reactions orchestrates self-replication of the DNA molecule. In fact one of the most powerful scientific models of biology is to view the complete organism as a vehicle set up by DNA to transfer the molecular information to the next generation of organisms. It is also widely accepted that life on earth has evolved though an early stage where simple molecular structures, probably related to the RNA molecule, replicated without the complex biochemistry of present organisms. This hypothesis is based on the fact that the RNA molecule combines the ability of replication with powerful catalytic functions. However, although the principle of self-replication and adaptability may be deduced from the structure of the DNA molecule, it has proven extremely difficult to construct artificial molecular systems which combines these two hallmarks of life, thus facilitating evolution by means of natural selection. It was thus a great surprise to the inventor when he after considerable trial and error, realized that such a system could be constructed, not from chemistry, but from carefully designed solid-phase elements, independently moving on a surface or floating freely in a liquid.

The following criteria must be met for a system to simulate an evolutionary process.

1. Reproduction: The element carrying the information must increase the robability for its own reproduction in its own environment.
2. Mutagenesis: The reproduction process must include a certain error tendency to create a repertoire of variants, which can be selected by the environment, a process referred to as natural selection.
3. Death: The system must involve recycling of the information carrying elements, such that the process is open-ended.

In order to provide such characteristics to a system based on free-floating physical elements, each element must comprise the ability to reversibly bind to each other, according to a set of rules, and in response to specific changes in the environment.

The inventor tried different alternatives for constructing such binding mechanisms, and came up with a number of possible solutions, including a combination of different systems comprising mechanical locking and mucous glues with temperature dependent adherence. Solutions comprising magnetic bindings provided however a unique way of binding since magnetic forces work across distances and involve specificity related to the positive and negative poles. The present invention may thus be combined with an electronic circuit and electromagnetic switches wherein each element is provided with a photovoltaic unit. Combined with the present invention such photoelectric arrangement also comprises a functional principle, which is not known in the prior art, e.g. Morowitz (supra), i.e. the ability to control inter-elemental bindings by changing the light surrounding the elements.

A further solution to the problem which was contemplated was the use of hard (permanent) magnetic materials. There is no obvious way by which binding between such materials are reversible in response to environmental changes, besides the fact that hard magnets become permanently inactivated when heated to extreme temperatures. The inventor found however that a combination of a hard and a soft (temporary) magnets constitutes a persisting reversible magnetic binding receptive to temperature changes in a range comprising the Curie point ($T_c$) of the soft magnet. This construction offers a surprisingly simple solution to the above-described problems involving materials that are commercially available and inexpensive.

There are several soft magnets with $T_c$ ranging from 10° C. to 40° C., such as Fe—Ni alloys, amorphous alloys and soft ferrites, making it possible to select materials for breaking and reestablishing magnetic bindings by temperature fluctuations around room temperature.

Freely-floating elements that form self-replicating and evolving polymers constitutes a new and surprising invention, which can be designed to address a number of different questions related to evolution and the behavior of complex systems. However, based on the forthcoming biological revolution it is designed a model of elements behaving as <<ideal nucleotides>>, i.e. elements which interacts according to the roles of nucleotides, but without the need for a complex biochemical machinery to catalyze these interactions.

To simulate the characteristics of nucleotides and DNA/RNA molecules, a simulation of the chemical interactions between these molecules must be included. Simulation of such chemical interactions should; 1) be reversible; 2) be specific; 3) also allow some degree of unspecific binding, and; 4) the bindings must be receptive to controllable changes in the environment of the element.

According to the present invention this can be accomplished by the use of magnetic materials with different $T_c$, combined such that it is possible to create a system wherein specific bindings are broken at specific temperatures. By regulating the temperature it is possible to control the forces acting between the elements in the system. Thus this system is analogous to a chemical system wherein the weak hydrogen bindings are broken at low temperatures, while to break the covalent bindings increased energy supply is necessary.

The present invention thus relates to a system of self-replication polymers composed of free-floating elements, or elements moving independently on a surface, designed to interact due to their magnetic and mechanical characteristics to simulate chemical interactions and an evolutionary process, without restriction to the size of the elements In the following two embodiments of the invention are described in detail, which however should not represent any restriction to the inventional idea. Example 1, FIGS. 3–11, describes a system of self-replicating polymers represented by free floating elements interacting by temperature dependent ferromagnetic forces. Example 2, FIGS. 12–13, describes self-replication of polymeric complexes achieved by elements independently moving on a surface and interacting by electromagnetic forces.

EXAMPLE 1

Figure 3:
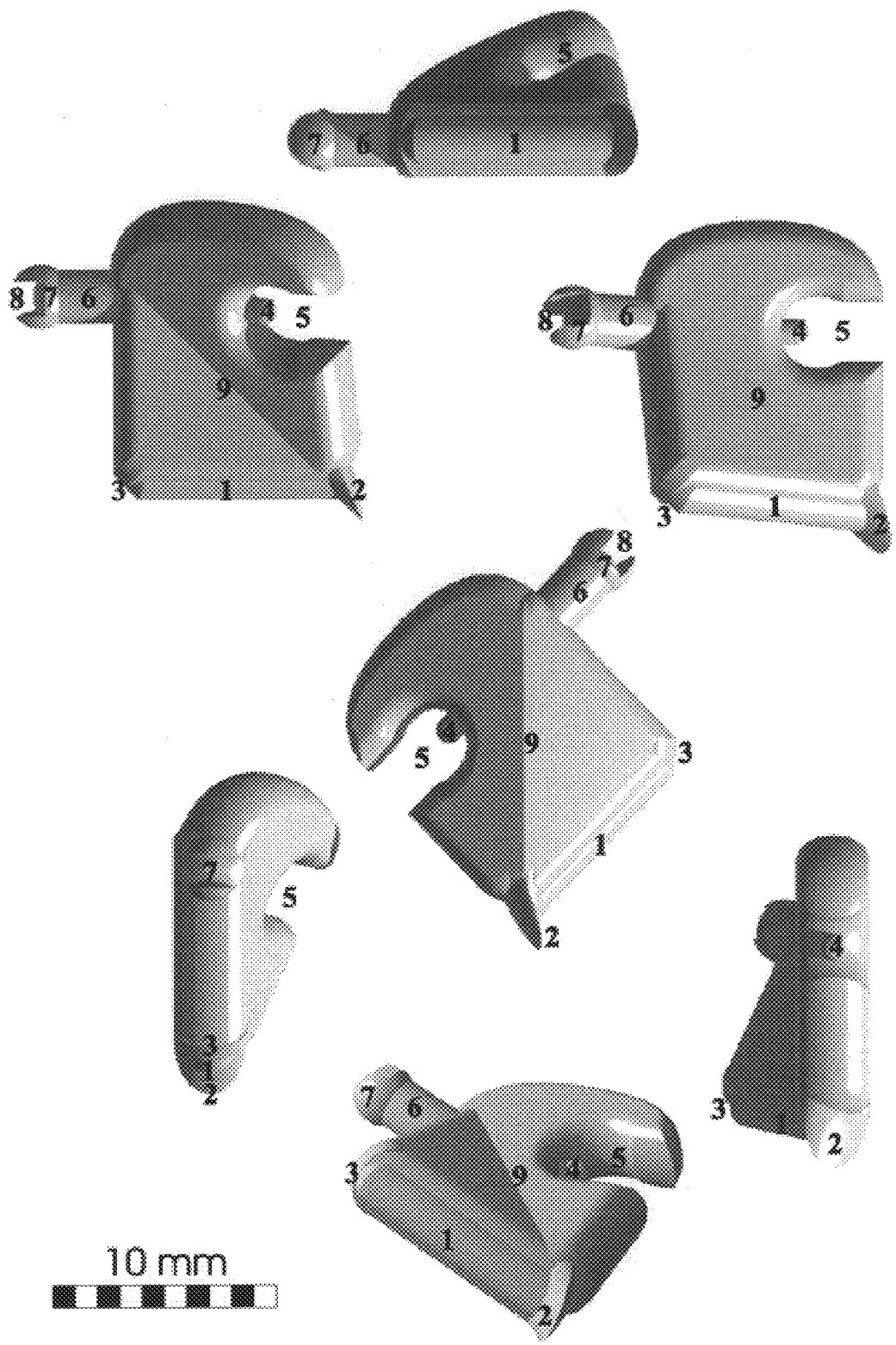
FIG. 3 illustrates the single element in the system seen from all angels, describes the design of the element.

The element of the system are shown in FIG. 3. In one embodiment they are approximately 10 mm×10 mm×3 mm, made of suitable materials, such as for example plastic and with a density similar to the density of water in the temperature range from 10° C. to 40° C. Each element comprises imbedded hard magnets and soft magnets in a pattern making possible bindings between only specific elements of choice.

Figure 4:
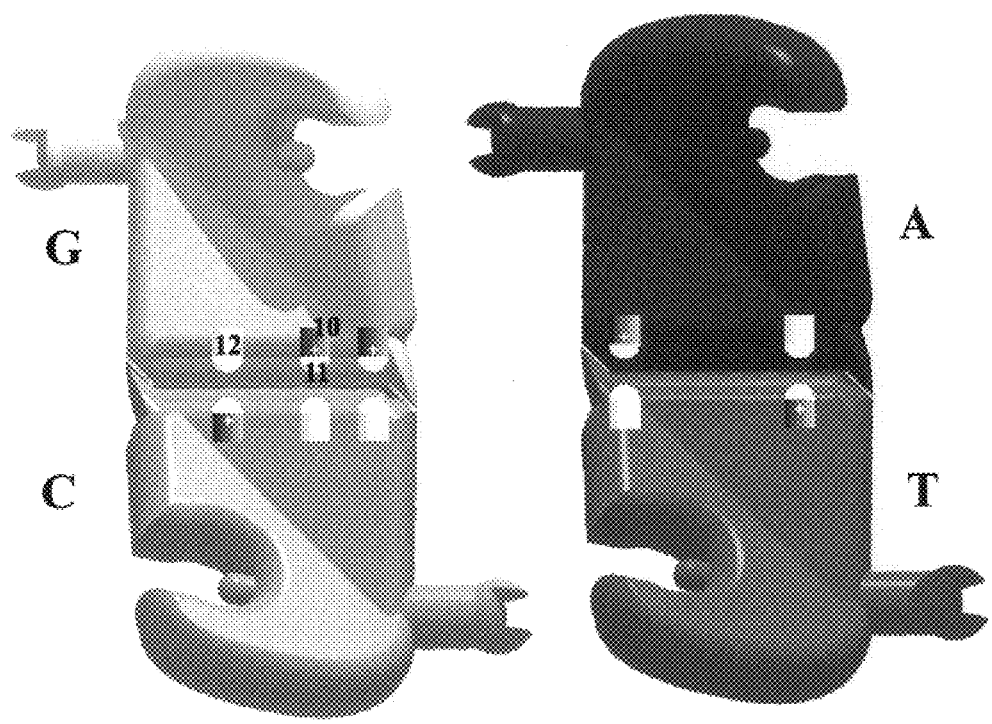
FIG. 4 illustrates one of the possible bindings, Binding I. This binding is specific for the hydrogen bindings between complementary units (G-C, A-T) representing the respective nucleotides.

The edge 1 of the element provides the contact surface which is exposed and wide, between two elements bound by Binding I, due to imbedded magnets below the surface. The semisylindrical surface of the edge 1 makes possible hinge like movement of the two elements, relative to each other. In one end of the edge 1 there is a cut-out 3, in the other end a tip 2 which fits into the cut-out 3 on the complementary element, causing Binding I to be directional, i.e. the elements bound points in opposite directions (FIG. 4). In one lateral edge, oriented in relation to the edge 1, there is a recess 5 with a peg 4 housing a soft magnet with $T_c$ higher (for example 30° C.) than the $T_c$ of the soft magnets in the edge 1. The magnet imbedded in the peg 4 is concealed and/or has small contact surfaces by the recess 5 to assure that Binding II never/seldom shall occur spontaneously and to prevent that a binding shall result between the magnet in the peg 4 and the magnets imbedded in the edge 1. Contralaterally to the recess 5 is a projection 6 with a spherical head 7 containing a hard magnet to attract the magnet imbedded in the peg 4. The head 7 has a slit 8 in the extension of the projection 6 to shield the magnet to prevent Binding II occurring spontaneously and prevent binding between the magnet in the head 7 and the magnets in edge 1. The projection 6 fits into the recess 5 and when Binding II is activated the elements may rotate about an axis through projection 6. Binding II has to a certain degree a hinge function since the projection 6 may slightly top over in the recess without breaking the binding. Diagonally from the tip 2 to the projection 6 runs an axis 9 around which the element is angled. The two parts of the element thus describe the legs of an angle of 36°. The recess 5 and the projection 6 are thus oriented in different planes and a double chain of elements will create a helix comprising 2×10 units in each rotation. This angled surface of the element facilitates further that the extension of a chain preferably occurs in the end of the chain carrying a recess 5, which simulates that the DNA synthesis occurs from the 3' end.

FIG. 4 illustrates Binding I and the pattern of hard and soft magnets to make possible that only element G links to element C and element A to T. This binding simulates H-bonds in the DNA molecules, and the G-C binding comprises 3 sets of magnets while the A-T binding comprises 2 sets of magnets, corresponding to 3 H-bonds and 2 H-bonds respectively between the bases. Accordingly the G-C binding is stronger than the A-T binding which promote the different characteristics of the different sequences of elements.

The imbedded magnets (10, 11, 12) have the following characteristics:

The magnet 10 is a hard magnet, made of for example neodymium, oriented with the positive pole towards the contact surface. Since all hard magnets are such oriented they are not attracted to each other and Binding I is specific for G-C and A-T elements respectively. Covering the positive pole of the magnet 10 is a hood 11 enveloping the outer end of the magnet and consisting of a soft magnetic material, made of for example a amorphous alloy, with $T_c$ in the temperature range, for example approximately 25° C., in which Binding I is broken. This hood 11 mediates the magnetic forces from the hard magnet 10 to the contact surface 1 of the element (FIG. 3) only when the temperature is below $T_c$. When the temperature is above $T_c$ the contact surface 1 is demagnetized. The soft magnet 12 is made of the same material as the hood 11 and has a $T_c$=25° C. The localization is designed to interact with the magnetic forces of the hard magnet located in the opposite position in the complementary element. The demagnetization of the soft magnet 12 at temperatures above approximately 25° C. promotes breaking of Binding I.

Figure 5:
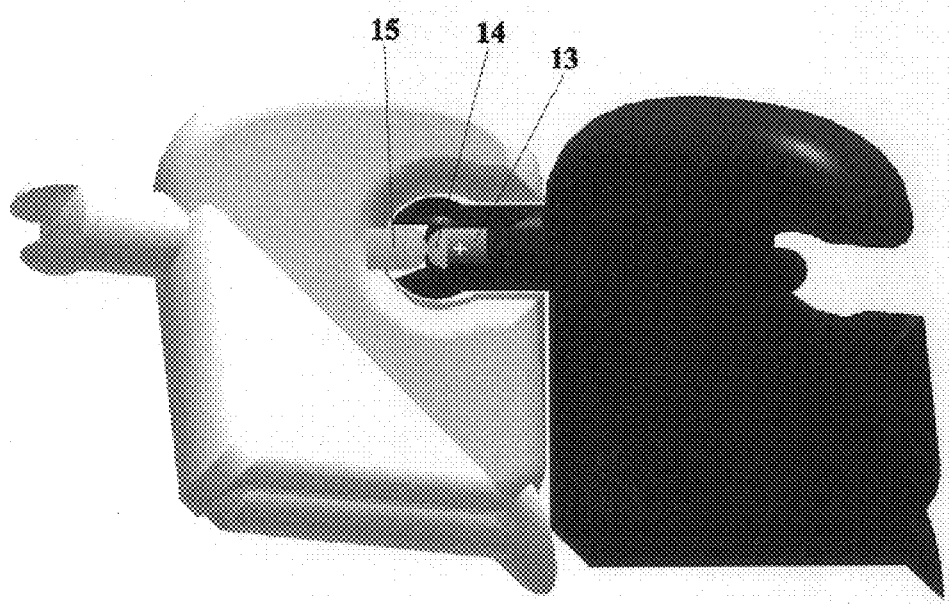
FIG. 5 illustrates the second of the possible bindings, Binding II. This binding represents the ribose-phosphate binding in the DNA molecule, which produce the nucleotide chains.

FIG. 5 illustrates Binding II, which simulates the ribose-phosphate binding in the DNA molecule producing the nucleotide chains. Binding II is maintained by the hard magnet 13, e.g. made of the same material as magnet 10, oriented with the positive pole towards the slit 8. This magnet is covered with the hood 14, made of a soft magnetic material with a $T_c$ higher than for the soft magnets in Binding I, say 30° C., (FIG. 3). Magnet 13 is magnetizing the soft magnet 15 located in the peg 4 in the complementary element. The soft magnet 15 is made of similar material as the hood 14, with $T_c$=30° C. Thus Binding II is maintained at temperatures below 30° C. The different demagnetizing temperatures for Binding I and II makes the last more resistant to higher temperatures. When the ambient temperature cycle around 25° C. only Binding I will be affected. Binding II breaks only when the ambient temperature is increased above 30° C.

Binding II allows the elements to rotate around the projection 6 (FIG. 3). Furthermore the direction of the slit 8 makes possible movement of the bound elements in a plane through the projection 6 (FIG. 1), vertically on the figure plane (FIG. 3). The described mobility of Binding II may lead to several secondary structures which will produce different characteristics, since structure and function are interrelated.

Since Binding II is made by magnets protected by the slit 8 and the recess 5, this binding will never/seldom come into being spontaneously between free-floating elements.

Figure 6:
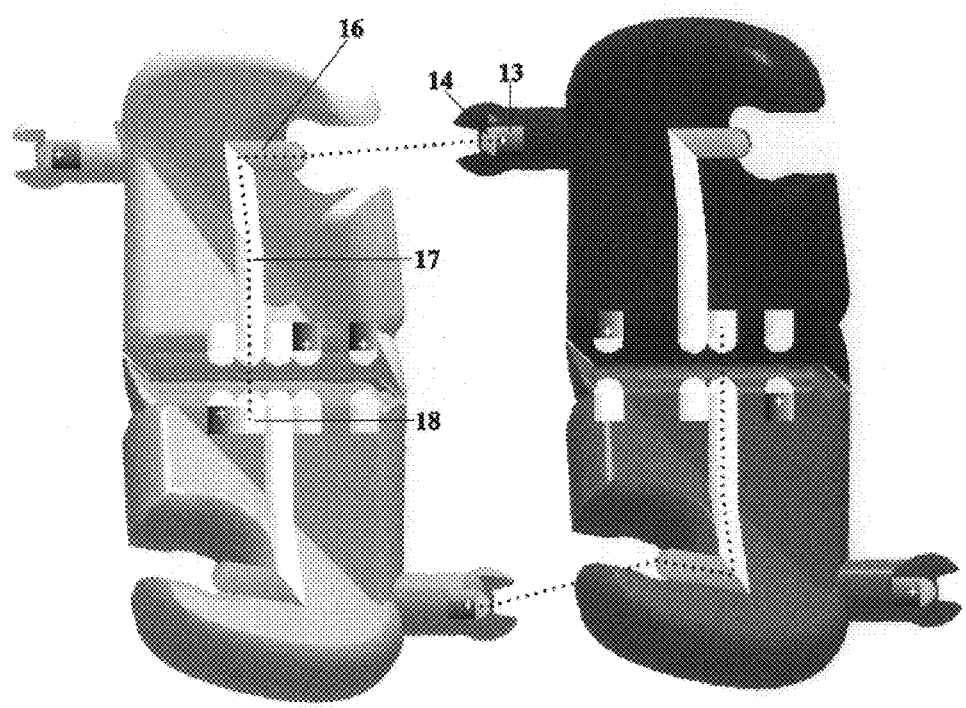
FIG. 6 illustrates that Binding I and II may be connected so that, the magnetic force in Binding I is enhanced for elements already connected by Binding II, causing that chains of the elements have greater attractive forces than free-floating elements. This will discourage mutual blocking of the free-floating elements.

FIG. 6 describes an embodiment of the invention wherein the elements are modified such that the magnetic forces in Binding I are enhanced when Binding II is activated.

The elements of this embodiment comprise the magnets 10, 11, 12, 13 and 14 described above. In addition each element contains a bridge comprising a soft magnet 16, with $T_c$=30° C., located inside the peg 4 and in contact with another soft magnet 17, with $T_c$=25° C., which ends at the contact surface 1 for Binding I between the magnets 10 and 12, opposite to an additional soft magnet 18 in the complementary element.

This arrangement will make Binding I stronger when the temperature is below 25° C. which is the temperature at which Binding I is broken. In this embodiment the elements already united in chains will exercise greater attractive forces than free-floating elements, and will thus reduce the trend that free-floating elements are blocking each other.

Figure 7:
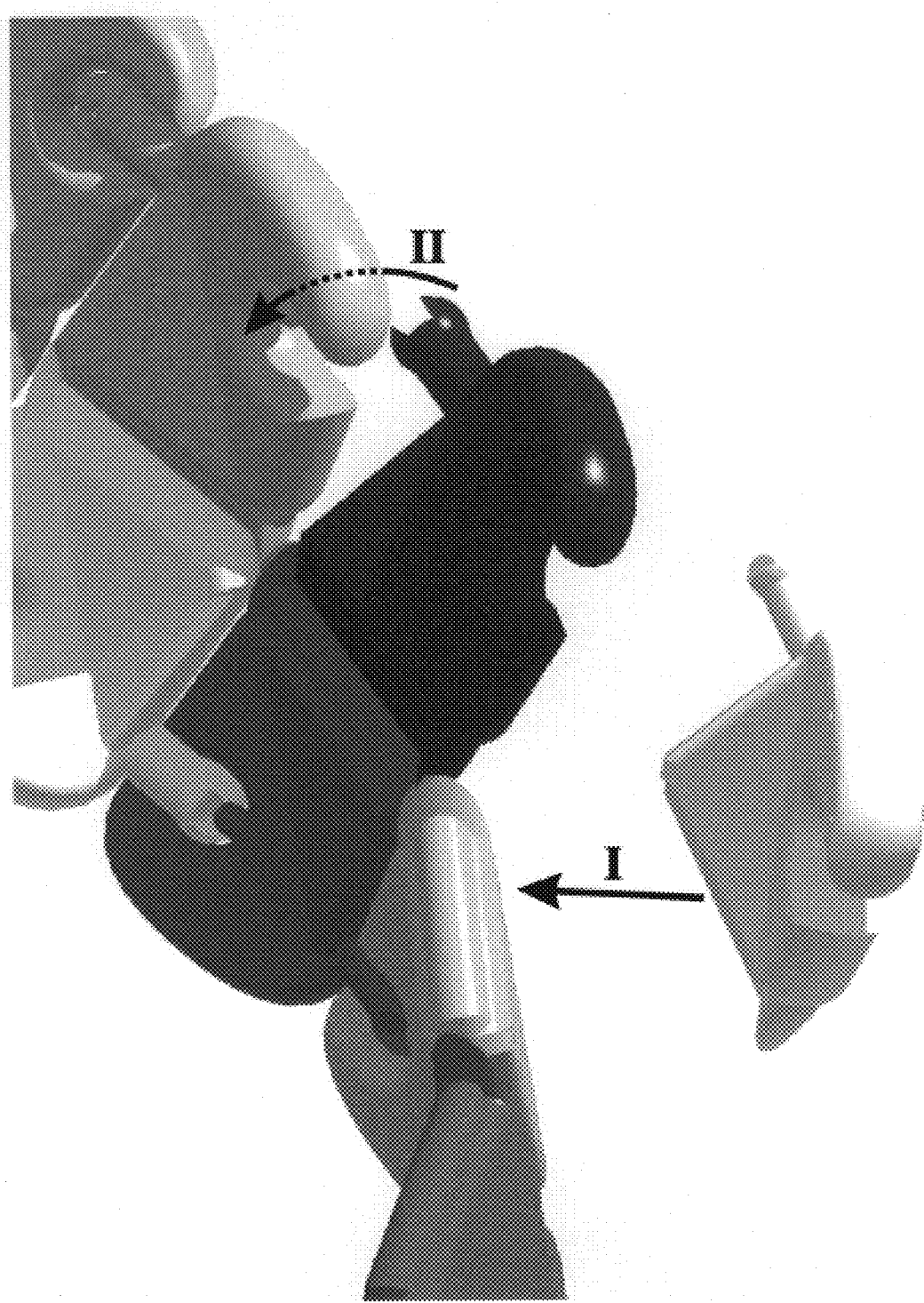
FIG. 7 illustrates the facilitation of the creation of a chain when the temperature in the liquid medium is reduced and a chain is already existing.

FIG. 7 illustrates that an existing chain will spontaneously facilitate the creation of complementary chains when the ambient temperature cycles above and below the $T_c$ for Binding I. Thus when the temperature is lowered the elements already chained together will attract free floating complementary elements and bind them via Binding I. This binding will then function as a hinge in that the newly bound elements will move back and forth around an axis through the contact surfaces 1, and cause that elements in juxtaposition will be geometrically in good position for spontaneously creation of Binding II, thus producing a new chain.

Figure 8:
FIG. 8 illustrates the creation of a double chained helix, due to the angle 9 (FIG. 1) on the element.

FIG. 8 illustrates the creation of the helix structure of the double chain, due to the angle 9 of the surface of the element, thus simulating the DNA helix structure.

Figure 9:
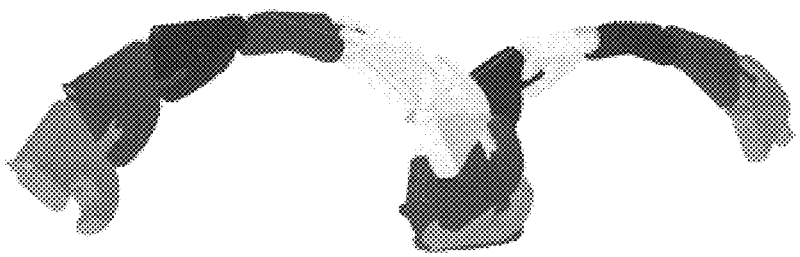
FIG. 9 illustrates separation of the two chains when the temperature of the liquid medium is increased above the $T_c$ for Binding I.
Figure 9:
Figure 9:
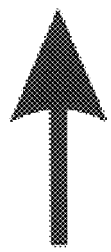
Figure 9:

FIG. 9 illustrates use of the system according to the invention to simulate denaturation of the DNA molecule by increasing the temperature. In the system according to the invention increasing the ambient temperature above the $T_c$ for Binding I will break the binding, and the two chains will separate.

Figure 10:
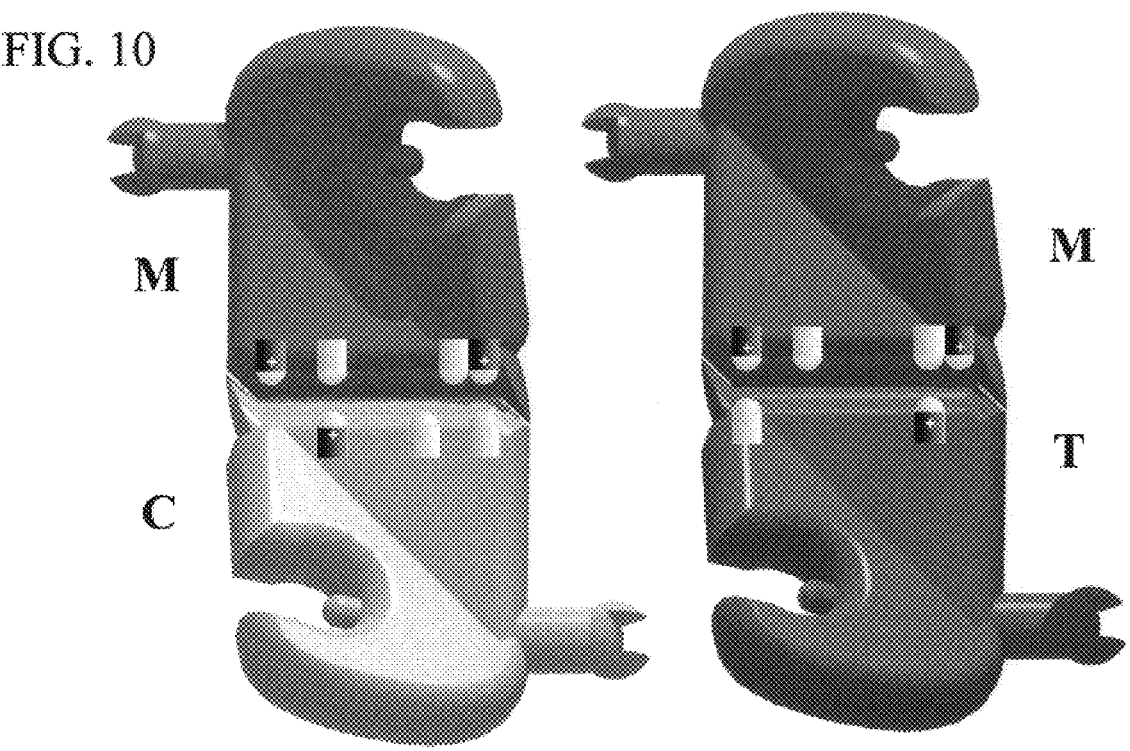
FIG. 10 illustrates the system used to simulate a mutation wherein a different element M is designed, which is able to bind both C and T elements.

FIG. 10 illustrates how the invention can simulate creation of a mutation. Mutagenes are agents inducing exchange of bases in the DNA molecule and can be for example chemicals changing the characteristics of the bases abolishing their ability to code specifically. In the system of the present invention an element M is constructed, which due to the pattern of magnets can bind (Binding I) to both the C element and T element.

Furthermore it is possible to construct mutagenic elements with a defect in the ability to create Binding II. This will result in shorter chains.

The system according to the invention can also be designed to simulate a primitive translation process wherein the genetic information in the DNA molecule is translated to chains of amino acids. In present organisms this process is performed by complex biochemical mechanisms involving cellular organelles called ribozomes. Resent findings suggest however that the evolutionary basis of this process be related to direct affinity between different amino acids and specific triplets or codons of nucleotides. The combination G-C-A in a chain of nucleic acids may e.g. attract the amino acid alanine. An exciting nucleotide chain may thus promote chains of amino acids in a similar manner as complementary strands are created.

In the present system an element Aa simulating an amino acid is designed to bind to the contact surface 1 of three specific elements of the simulated DNA chain, with which the following creating of a binding (corresponding to Binding II) for creating a chain of amino acids to simulate a peptide or protein. By varying the pattern of magnets imbedded in the contact surface I of the Aa elements, different amino acids, binding to different codons of elements are designed.

Still further embodiments of the invention may comprise elements simulating biological co-factors with the ability to interfere with or facilitate binding of specific elements.

In other embodiments the magnetic forces in the elements can be produced by electromagnets powered by small photovoltaic units on each element. In this case the evolutionary process is powered by changes in the electromagnetic radiation instead of water temperature. These two mechanisms may also be combined.

Figure 11:
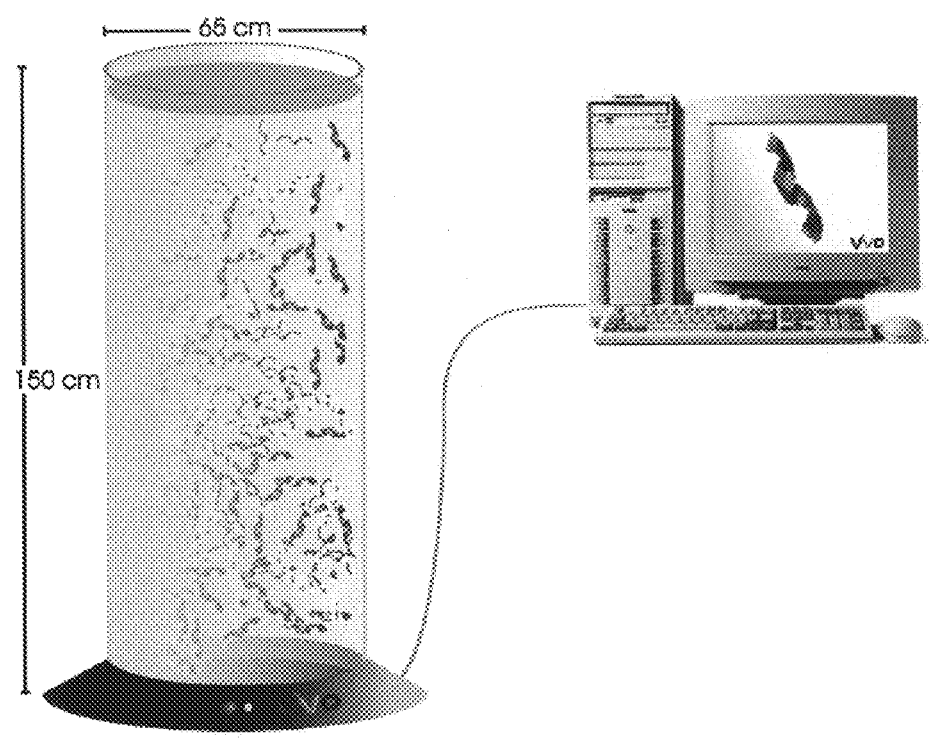
FIG. 11 illustrates a total assembly comprising a transparent water tank with a base containing electronically operated thermostats and turbulence generator, connected to a computer for operating and monitoring the temperature and turbulence in the liquid medium.
Figure 12:
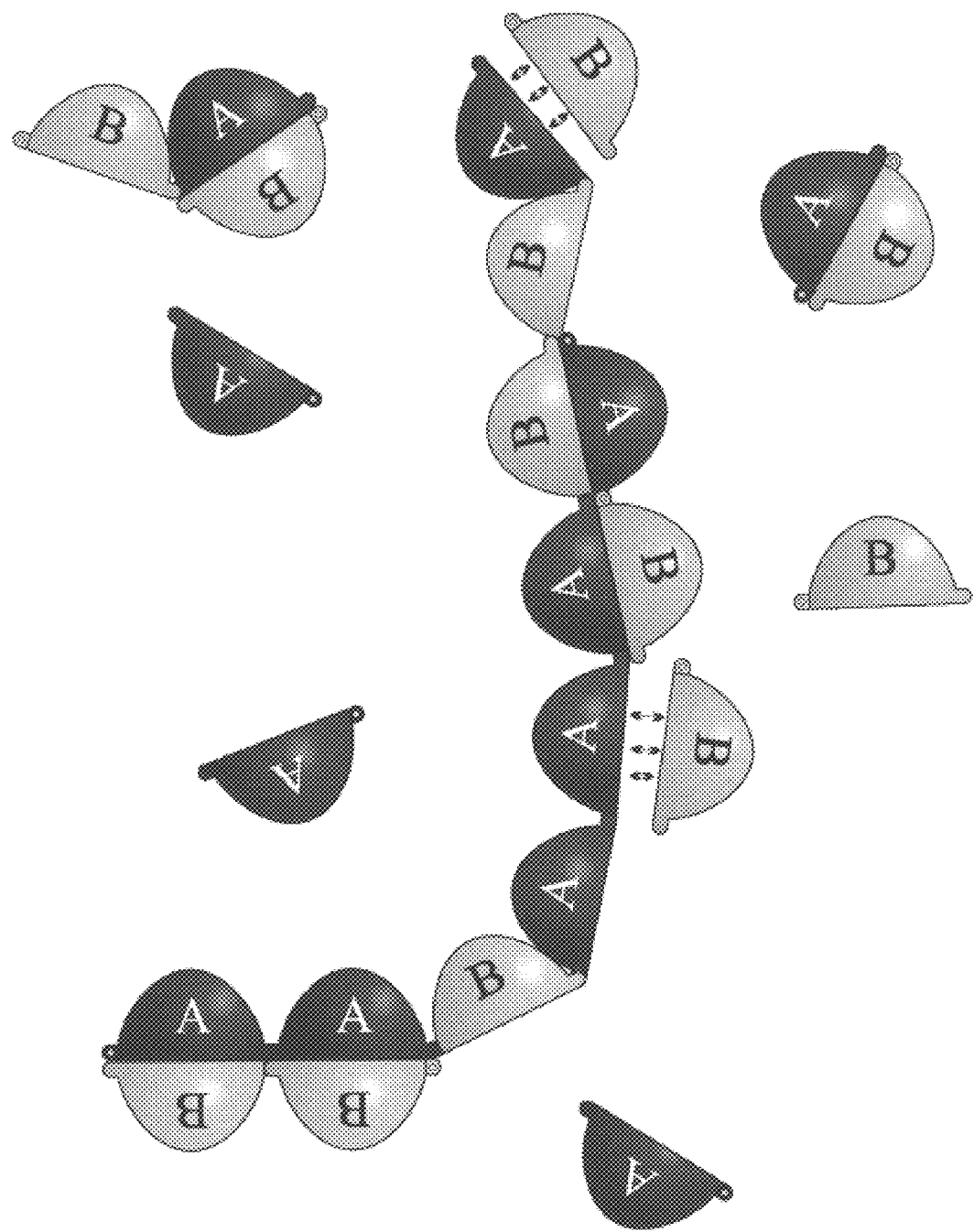
FIG. 12 illustrates independently moving elements A and B establishing Binding I (hydrogen binding between complementary units) and Binding II (representing ribose-phosphate binding in the DNA molecule). The elements are shaped as half hemispheres with four wheels (w) which are freely rotating around a central axis (a), located on the flat horizontal surface of the element which is not part of the binding structure.

FIG. 11 illustrates a container for liquid, such as water, with transparent wall for example 150 cm tall and 65 cm in diameter, containing 500 l of liquid. The container has a base with an electronically operated thermostat and turbulence generator, connected to a programmable unit for regulation of liquid temperature and turbulence, for example a computer.

Simulation of Self-replication and Mutation

1. As a start situation a large number of different elements, such as 2500 of each of the four types, are floating freely in the liquid such as water of the container (FIG. 11), and the temperature of the liquid is between $T_c$ for Binding I and II, such as 28° C.

2. The first chain can be created
   a) spontaneously via Binding II, which has been designed to be a slow process due to the location of the magnets 13, 14 and 15, or
   b) by constructing a chain of elements and add this chain to the container.

3. A new chain is then created by lowering the water temperature below the $T_c$ for Binding I, such as for example 20° C. Free elements will bind to complementary elements (G-C, A-T) in the template chain, and neighboring elements will be connected by Binding II as described above, simulating elongation of the chain. When the chain is elongated the total binding becomes stronger since an increasing member of magnetic bindings are holding the chains together.

The result is creation of a simulated DNA helix.

Chain reaction: To facilitate a chain reaction it will be necessary to let the water temperature cycle between for example 20° C. and 28° C., i.e. below and above the $T_c$ for Binding I. New chains will then be created as described above and when Binding I is broken by increasing the temperature the number of template chains are doubled. This results in an exponential increase of the number of chains in the container.

Recirculation or death: A chain will dissolve if the water temperature is increased above the $T_c$ for Binding II. Balanced or specific death of certain chains can be obtained by regulating temperature and turbulence in such a way that short pulses of water with a specific temperature hit a group of chains.

Mutations: Point mutations will appear spontaneously by incorporation of different mutagenic elements in the chains. These mutagenes can be of the type suggested in FIG. 10, wherein Binding I is affected or a type wherein Binding II is affected (not shown).

Figure 2:
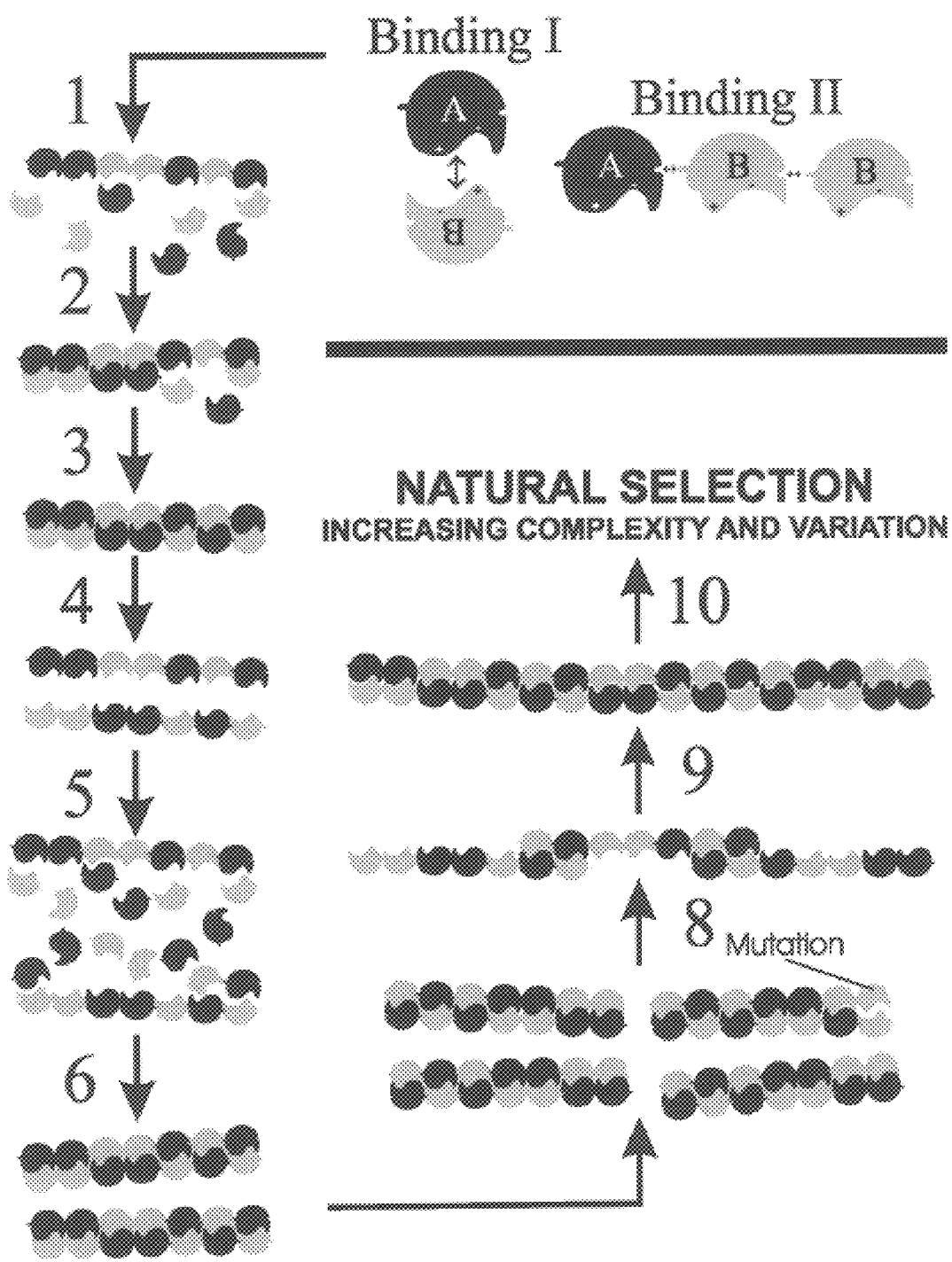
FIG. 2 illustrates schematically how a combination of two inter-elemental bindings (Binding I and II) constitutes the basis of self-replication and an evolutionary process. The two elements A and B bind each other through forces receptive to cyclic temperature changes, so that the binding is created at low and broken at high temperatures (Binding I). The elements connect to form chains when oriented in a favorable geometrical position, by a binding mechanism less influenced by temperature (Binding II). A random chain of elements is created spontaneously (1), at lower temperatures the free floating elements arrange themselves along the existing chain (2), the units are bound together to form a complementary chain and a double chain is created (3), the temperature is increased and the chains depart (4), the temperature drops again and free floating elements arrange themselves along the two chains (5), two double chains are created (6), leading to that the number of chains will increase exponentially (7). New sequences occurs due to miss-incorporations (point-mutation) (7), or as a consequence of rearrangements due to double hybridizing (8) thus resulting in longer chains (9). Chains which in a given environment are more often reproduced will increase in number at the expense of other chains, and thus be selected by means of natural selection (10). This will drive the process towards chains with increasing complexity and better ability to self-replicate.

Mechanical stress, deficient Binding II or high temperature will produce shorter chains, while longer chains can be produces when one chain binds two other chains (double hybridization) (FIG. 2) or because Binding II occurs spontaneously. A chain of 10 elements can be varied $4^{10}=10^6$ different ways while a length of 20 elements gives $10^{12}$ possible combinations. If one new chain of 20 elements is produced every minute, testing of all combination will require $2\times10^6$ years.

Natural selection

Mutants, which for any reason are more reproducible, will increase in number at the expense of others. Such advantageous characteristics can be;

Secondary structures stabilizing the chain such that it is resistant to breaking when the temperature is increased, secondary structures inhibiting the replication of other chains (simulating natural ribozymes), secondary structures <<taking advantage>>of other elements in the solution, sequences adapted to the distribution of freely flowing elements, and chains cooperating with other chains.

The direction of the evolutionary process will be modified by the environment in the container (temperature and turbulence profile, concentration of elements, presence of other chains and elements). The selection process will drive the system towards better replication rates and increasing complexity.

EXAMPLE 2

Elements moving on a surface.

Self-replication of polymeric complexes is also achieved through elements moving on a surface. One design of such a system involves self-propelled elements on wheels moving in chaotic patterns, and connecting by Binding I and Binding II through electromagnetic forces. A detailed embodiment is presented in FIGS. 12 and 13.

Figure 13:
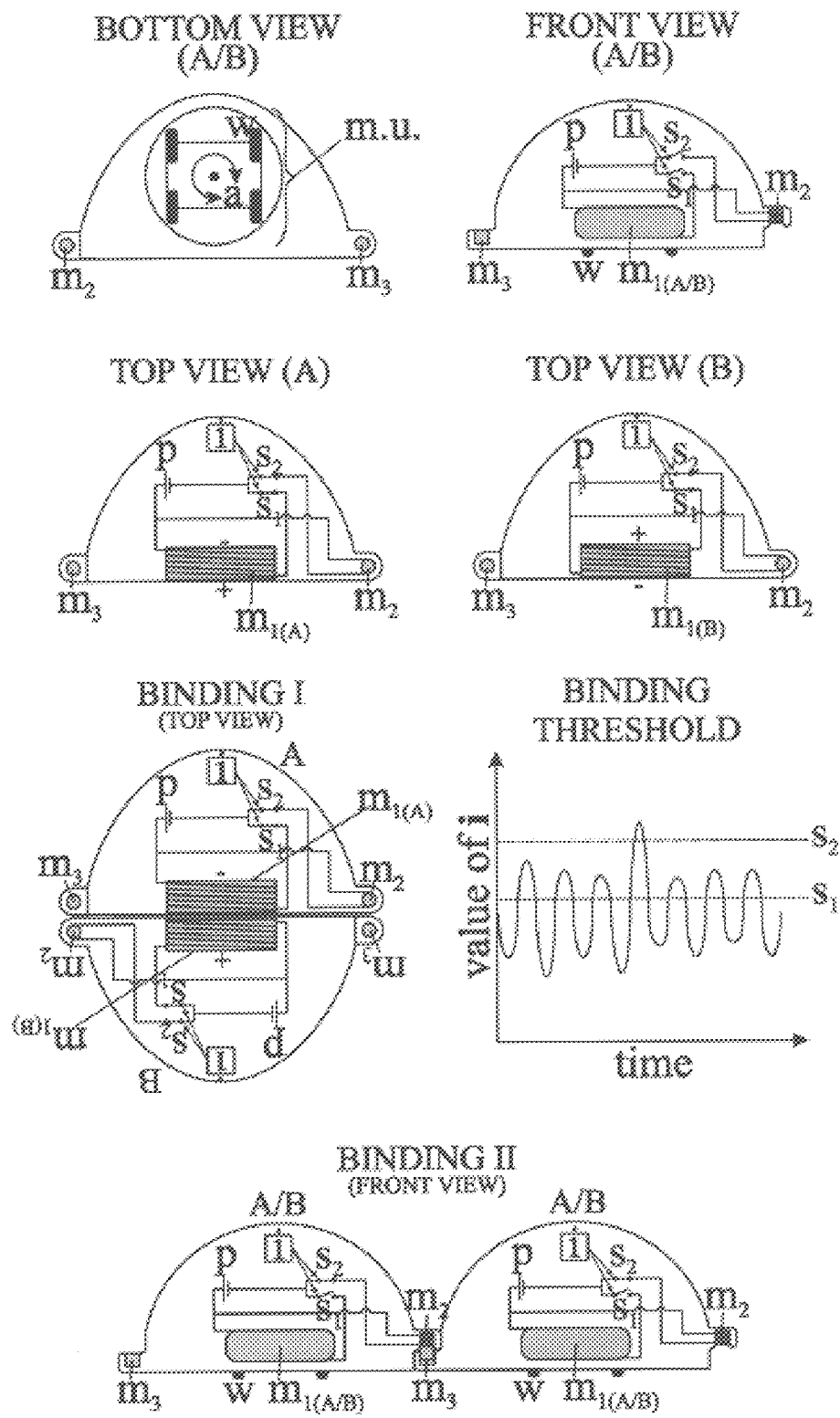
FIG. 13 illustrates sectional views of the elements A and B seen from the bottom, front and top, respectively. Furthermore Binding I and II are illustrated, with a graphical illustration of the binding threshold showing the variation of the input signal (from the input device) (i) over time and the resulting opening and closing of the switches $s_1$ and $s_2$. Further abbreviations are: m.u=motor unit w=wheels. $m_1$, $m_2$, $m_3$=electromagnets. p=power supply.

The motor unit (m.u.) with 4 wheels (w) has free rotation around a central axis (a) and is programmed to move the element in a chaotic pattern. The motor unit is powered by an independent power supply, or by the power supply (p) providing the electromagnets ($m_1$ and $m_3$) (FIG. 13).

There are two different types of elements (A and B), which form complementary pairs through Binding I. This specific binding occurs because of opposite charge in the central electromagnet ($m_1$), which is oriented perpendicular to the underlying surface. Additional pairs of elements (e.g. A-T and G-C, corresponding to the nucleotides) increase the complexity of the system. Such specific pairing between several elements may be achieved by combinations of positive and negative magnets in Binding I, or by differentiating the profile of the surface of the binding.

The elements (A or B) are joined together in strands/polymers by Binding II. This binding occurs between the electromagnet ($m_2$) and the soft/temporary magnet ($m_3$), which are positioned to meet in the horizontal orientation. The activated electromagnet ($m_2$) pulls on the soft/temporary magnet ($m_3$) to form a hinge between the connected elements.

Binding I is designed to occur spontaneously between independently moving elements, while Binding II is designed to rarely occur spontaneously between independently moving elements. However, Binding II is designed to occur spontaneously between elements connected by Binding I to elements already connected by Binding II.

The electromagnets ($m_1$ and $m_2$) are powered by the power supply (p), which may e.g. be an electrolytic battery, a fuel cell, or a photovoltaic unit.

The magnetic forces of Binding I and Binding II is regulated by the switches ($s_1$) and ($s_2$), respectively. These switches are themselves regulated by the in-put device (i), which may e.g. be a radio receiver, a heat or light sensor, or a timer. ($s_2$) is set to open more rarely than ($s_1$), thereby making Binding II more stabile than Binding I. In one design ($s_1$) is sensitive to cyclic changes in light intensity (e.g. day and night), while ($s_2$) only opens in response to light intensities above these cyclic changes. An example of this relationship between the switches ($s_1$) and ($s_2$) and a cyclic in-put variable of (i) is illustrated in the binding threshold graph (FIG. 13).

Applications

The system according to the present invention has several areas of application.

Education: The system is, as demonstrated above, able to simulate the fundamental characteristics of life in a manner that is easily understandable by children and adults. The system mediates biologically and evolutionary knowledge and can be used as educational tools for general and molecular biology. It can furthermore be combined with a computer based multimedia educational system, suitable for different age groups and competence levels. The programmable unit according to the invention (FIG. 11) can be used with suitable software and hardware to develop programmable temperature and turbulence profiles favoring different type of chains and thereby guide the evolutionary process in different directions, protocol the development of old and new chains and map the characteristics of different chains, for example possible secondary structures.

Games: An evolutionary system comprise a form of <<life>>and the challenge will be to <<breed>>new and steadily more robust and complex <<species>>of this form of life, by playing with the environment (temperature, turbulence, additional elements) to increase the probability for the creation and well being of certain chains. The challenge is then stepped up to a higher level by placing the above-created chain in a container with another sequence. The two sequences are then parts of each other's environment, which may lead the evolutionary process in new directions. Some sequences may be destroyed in the competition while other may cooperate on the replication process.

By using electronic communication applications, e.g. the Internet, various sequences and their characteristics may be exchanged and the evolutionary process has expanded beyond its own container.

The challenge of this game will be to produce sequences, which compete with other under varying conditions. The sequences may be named and made known via Internet.

Scientific tool: This invention represents an artificial replication system comprising the ability to evolution by means of natural selection, and will as such represent an independent scientific achievement. Furthermore, the invention constitute a new and unique tool for simulating and investigating the behavior of complex systems, particularly related to the characteristics of self-replication and natural selection. Additionally, the specific hybridization between polymers may be applied as means for calculation, an application that has been extensively demonstrated for nucleic acids (DNA computing).

Sculpture, decoration and exhibitions: The system according to the present inventions has dynamic characteristics, which may be visually appealing. Thus it is possible to use the system to create new and visually appealing physical structures, not only in the form of helical structures resembling the DNA molecule. Furthermore a reproducible system for swimming pools, can be designed for decoration purposes and/or as toys.

What is claimed is:

1. A system comprising:
   a plurality of independently moving elements;
   wherein the elements reversibly bind in response to environmental changes to form template-replicating polymeric complexes,
   said binding being dependent on the element's physical shape and binding mechanisms,
   wherein the binding mechanisms are selected from the group consisting of mechanical, ferromagnetic, and electromagnetic binding mechanisms,
   wherein the changes in the environment are selected from the group consisting of ferromagnetic, electromagnetic, kinetic, and thermal change.

2. The system of claim 1, wherein an element is complementary to another element in physical shape and binding mechanism.

3. The system of claim 1, wherein an element is complementary to multiple elements in physical shape and binding mechanism.

4. The system of claim 1, wherein the elements bind to form pairs.

5. The system of claim 1, wherein the elements bind to form polymers.

6. The system of claim 1, wherein the binding between elements comprises:
   a first type of binding; and
   a second type of binding,
   wherein the first type of binding results in pairing,
   wherein the second type of binding results in polymerization.

7. The system of claim 6, wherein the first type of binding further comprises exposed or wide contact surfaces,
   wherein the exposed or wide contact surfaces promote binding between individually moving elements.

8. The system of claim 6, wherein the second type of binding further comprises concealed or small contact surfaces
   wherein the concealed or small contact surfaces restrict binding between individually moving elements.

9. The system of claim 6, wherein binding of the second type is promoted between a first element and a second element when the first element is bound to a third element by first type binding, and the second element is bound to a fourth element by first type binding, and the third element is bound to the fourth element by second type binding.

10. The system of claim 6, wherein binding of the second type is more stable than binding of the first type.

11. The system of claim 1, wherein the portion of the independently moving elements involved in binding between elements comprises materials with different Curie points (Tc) such that specific bindings are responsive to specific changes in temperature.

12. The system of claim 1, wherein the portion of the independently moving elements involved in binding between elements comprises electromagnets regulated through electronic circuits.

13. The system of claim 1, wherein the portion of the independently moving elements involved in binding between elements comprises mechanical locking systems.

14. The system of claim 1, wherein the portion of the independently moving elements involved in binding between elements comprises combinations of ferromagnetic, electromagnetic, and mechanical binding mechanisms.

15. The system of claim 1, wherein the elements comprise a power supply.

16. The system of claim 15, wherein the power supply is selected from the group comprising an electrolytic battery, a fuel cell, and a photovoltaic unit.

17. The system of claim 1, wherein the elements comprise a self-propelling motor unit.

18. The system of claim 1, wherein the inter-elemental bindings are connected to a regulatory device, wherein the regulatory device is selected from the group comprising of a radio receiver, a heat sensor, a light sensor, and a timer.

19. The system of claim 6, wherein the elements further comprise a plurality of contact surfaces,
wherein binding between elements is dependent on magnetic forces and on the size and shape of the contact surface,
wherein the first type of binding comprises a semicylindrical contact surface,
wherein the second type of binding comprises an interlocking contact surface defined by the interlocking of a first shape and a second shape;
wherein the first shape comprises a projection ending in a spherical head,
wherein the spherical head defines a slit,
wherein the second shape comprises a peg connected to sides that define a recess.

20. The system of claim 19, wherein the semicylindrical contact surface comprises at least one permanent magnet oriented with the positive pole directed towards the contact surface and coated with a temporary magnet;
wherein the interlocking contact surface on the first shape comprises at least one permanent magnet oriented with the positive pole directed towards the contact surface and coated by a temporary magnet;
wherein the interlocking contact surface on the second shape comprises at least one temporary magnet.

21. The system of claim 20, wherein the Tc for the temporary magnet in the semicylindrical contact surface is lower than for the temporary magnets in the interlocking contact surface on the first shape and the interlocking contact surface on the second shape.

22. The system of claim 21, wherein the Tc for the temporary magnet in the semicylindrical contact surface is 25° C.,
wherein the $T_c$ for the temporary magnets in the interlocking contact surface on the first shape and the interlocking contact surface on the second shape is 30° C.

23. The system of claim 21, wherein the elements comprise:
a first type of element,
a second type of element,
a third type of element,
a fourth type of element, and
a fifth type of element,
wherein the first type of element binds with the fourth type of element through first type binding;
wherein the second type of element binds with the third type of element through first type binding;
wherein the fifth type of element binds all other types of elements through first type binding.

24. The system of claim 19, wherein the element comprises a tip portion,
wherein a line connecting the tip portion with the base of the projection defines the apex of an interface between a first surface and a second surface;
wherein the angle between the two surfaces thus created is 36°.

25. The system of claim 19, wherein the elements have imbedded adjacently localized temporary magnets comprising materials with two different Tc, running from the interlocking contact surface to the semicylindrical contact surface,
wherein Tc for the temporary magnet closest to the interlocking contact surface is 30° C. and for the temporary magnet closest to the semicylindrical contact surface is 25° C.

26. The system of claim 19, wherein the permanent magnet is selected from the group comprising neodymium, alnico, and ferrites,
wherein the temporary magnet is selected from the group comprising Fe-Ni-alloy, amorphous alloy, and soft ferrites.

27. The system of claim 1, wherein the density of the elements is close to the density of water in the temperature range from 10° C. to 40° C.

28. The system of claim 1, wherein the elements float in a transparent water-filled container.

29. The system of claim 1, wherein the elements are disposed and mobile on a surface.

30. The system of claim 1, further comprising a control device,
wherein the environment of the elements can be manually or electronically controlled,
wherein the control device is connected to an electronic communication network.

31. The system of claim 30, wherein the electronic communication network is the Internet.

32. A method for simulating creation and replication of DNA comprising:
placing different types of elements of the system of claim 1 in water in a container,
setting the water temperature to a first temperature between the Tc for the temporary magnet in the semicylindrical contact surface and the Tc for the temporary magnets in the interlocking contact surface on the first shape and the interlocking contact surface on the second shape,
waiting for a chain of elements to form via binding of the second type,
lowering the water temperature to a second temperature below the Tc for the semicylindrical contact surface, and
cycling the temperature between the first temperature and the second temperature.

* * * * *